(12) United States Patent
Park et al.

(10) Patent No.: US 8,853,316 B2
(45) Date of Patent: Oct. 7, 2014

(54) THERMOPLASTIC ELASTOMER COMPOSITION

(75) Inventors: Joon Chul Park, Gyeonggi-do (KR); Min-Jae Yoon, Gyeonggi-do (KR); Mu-Jung Lee, Busan (KR); Kyoung-Min Hong, Gyeongsangnam-do (KR); Jae-Wook Jeon, Busan (KR)

(73) Assignees: Hyundai Motor Company, Seoul (KR); Kia Motors Corporation, Seoul (KR); Hwaseung Material Co., Ltd., Yangsan, Gyeongsangnam-Do (KR)

( * ) Notice: Subject to any disclaimer, the term of this patent is extended or adjusted under 35 U.S.C. 154(b) by 199 days.

(21) Appl. No.: 13/372,966

(22) Filed: Feb. 14, 2012

(65) Prior Publication Data

US 2013/0137809 A1     May 30, 2013

(30) Foreign Application Priority Data

Nov. 28, 2011 (KR) .................. 10-2011-0125337

(51) Int. Cl.
*C08K 3/18* (2006.01)
*C08L 23/00* (2006.01)

(52) U.S. Cl.
USPC ........................................ 524/432; 524/528

(58) Field of Classification Search
USPC .......................................................... 524/432
See application file for complete search history.

(56) References Cited

U.S. PATENT DOCUMENTS

| | | |
|---|---|---|
| 2004/0214958 A1 | 10/2004 | Jourdain et al. |
| 2005/0003158 A1* | 1/2005 | Yamasa et al. ............. 428/143 |
| 2009/0270525 A1* | 10/2009 | Yamamoto et al. ......... 521/140 |

FOREIGN PATENT DOCUMENTS

| | | |
|---|---|---|
| JP | 06-316658 | 11/1994 |
| JP | 10324200 A | 12/1998 |
| JP | 2004223753 A | 8/2004 |
| KR | 10-0368867 | 11/2001 |
| KR | 10-2006-0049483 | 5/2006 |
| KR | 10-2010-0054777 | 5/2010 |

* cited by examiner

*Primary Examiner* — Hui Chin
(74) *Attorney, Agent, or Firm* — Edwards Wildman Palmer LLP; Peter F. Corless

(57) ABSTRACT

A thermoplastic elastomer composition, and more particularly, a thermoplastic elastomer composition for use in manufacturing a joint connecting a glass run and an inner-belt. The thermoplastic elastomer composition includes an ethylene propylene diene monomer (EPDM), polybutene (PB), polypropylene (PP), paraffin oil, a peroxide cross-linking agent, and an antioxidant.

19 Claims, No Drawings

THERMOPLASTIC ELASTOMER COMPOSITION

CROSS-REFERENCE TO RELATED APPLICATION

This application claims under 35 U.S.C. §119(a) the benefit of Korean Patent Application No. 10-2011-0125337, filed on Nov. 28, 2011, the entire contents of which are incorporated herein by reference.

BACKGROUND (a) Technical Field

The present invention relates to a thermoplastic elastomer composition. More particularly, the present invention relates to a thermoplastic elastomer composition for use in manufacturing a joint connecting a glass run and an inner-belt.

(b) Background Art

Weather strips are generally used to seal the space between the body of a vehicle and the door frames thereof to block infiltration of external impurities, reduce wind noise at high speed, prevent the doors from shaking, and for a variety of other purposes. Typical weather strip types include body/door weather strips that are installed between the door body and the vehicle, glass runs that seal peripheral edges of door glass moving up and down, inner-belts, and outer-belts.

Weather strips are formed of elastic and durable materials in order to maintain excellent sealing performance. Weather strips are generally formed of an ethylene-propylene-diene monomer (EPDM) synthetic rubber, an ethylene-propylene monomer (EPM) synthetic rubber, or a thermoplastic elastomer. In particular, highly elastic EPDM is widely used in the conventional art in order to improve sealing performance of weather strips. Recently, the use of thermoplastic rubber weather strips has been increasing due to improved elasticity of thermoplastic rubbers and advancing designs/shapes of weather strips.

In general, a glass run and an inner-belt are separately manufactured and then assembled during a door assembly process. In this regard, a narrow chink or gap is formed between the two parts at their respective contact surfaces, which may increase wind noise at high speed, thereby increasing the level of noise in the interior of the vehicle. This assembly process has several disadvantages. For example, the assembly process typically requires the use of environmentally hazardous chemicals such as adhesives or primers to connect the glass run and the inner-belt. Another disadvantage is that the presence of manufacturing defects in the components to be assembled such as, for example, the presence of burs in the glass run, result in components that must be discarded because they cannot produce a satisfactory joint, which increases substantially the cost of vehicle production.

Accordingly, there is a need in the art for thermoplastic elastomer compositions that overcome the above-described disadvantages of the conventional art.

SUMMARY OF THE DISCLOSURE

The present invention provides a thermoplastic elastomer composition that may be used to manufacture a joint connecting a glass run and an inner-belt by integrally injection-molding the glass run and the inner-belt.

According to an aspect, the present invention provides a thermoplastic elastomer composition that may be efficiently used to manufacture a joint connecting a glass run and an inner-belt by integrally injection-molding the glass run and the inner-belt, the thermoplastic elastomer composition including: 80 to 90 parts by weight of an ethylene propylene diene monomer (EPDM); 30 to 50 parts by weight of polybutene (PB); 30 to 40 parts by weight of polypropylene (PP); 110 to 130 parts by weight of paraffin oil; 0.7 to 0.9 parts by weight of a peroxide cross-linking agent; and 0.5 to 0.8 parts by weight of an antioxidant.

A thermoplastic elastomer composition according to the present invention is formed of environmental-friendly materials compared with conventional art ethylene propylene diene monomer (EPDM) rubber materials.

A thermoplastic elastomer composition according to the invention has numerous advantages, including: high processability (flowability) allowing it to be efficiently used for injection-molding, excellent compatibility with a glass run formed of an EPDM material and an inner-belt formed of a thermoplastic rubber, high adhesive force so as not to be separated by external force even after molding, and low external defects such as discoloration and deformation. Additionally, the thermoplastic elastomer composition has excellent sealing properties due to high adhesive force with a glass run and an inner-belt, and therefore reduces wind noise at high speed.

A thermoplastic elastomer composition according to the invention may be used as a joint connecting a glass run and an inner-belt, so that the glass run and the inner-belt may be integrally injection-molded. Consequently, the function and external quality of a product incorporating the thermoplastic elastomer composition may be improved. Additionally, the product is environment-friendly since chemicals such as adhesives or primers are not used. Moreover, burs and defective products can be reduced by using the thermoplastic elastomer composition, thereby reducing significantly the manufacturing costs for the product.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9. With respect to sub-ranges, "nested sub-ranges" that extend from either end point of the range are specifically contemplated. For example, a nested sub-range of an exemplary range of 1 to 50 may comprise 1 to 10, 1 to 20, 1 to 30, and 1 to 40 in one direction, or 50 to 40, 50 to 30, 50 to 20, and 50 to 10 in the other direction.

A thermoplastic elastomer composition according to an embodiment of the present invention may include an ethylene propylene diene monomer (EPDM), polybutene (PB), polypropylene (PP), paraffin oil, a peroxide cross-linking agent, an antioxidant, and additives that are commonly used in the art. Components of the thermoplastic elastomer composition according to the current embodiment will be described in more detail.

The content of the EPDM may be in the range of 80 to 90 parts by weight, and may preferably be 80 parts by weight. If the content of the EPDM is less than 80 parts by weight in the thermoplastic elastomer composition, injection-molding may not be properly performed due to high flowability, and dimensional stability of the resulting product may be decreased; additionally, resilience of the product may be reduced due to low content of rubber in the product. On the other hand, if the content of the EPDM is greater than 90 parts by weight, adhesive force and injection-molding efficiency may be reduced due to low flowability caused by low molecular weight (viscosity) of the rubber component.

The content of polybutene (PB) may be in the range of 30 to 50 parts by weight, and may preferably be 40 parts by weight. If the content of polybutene (PB) is less than 30 parts by weight in the thermoplastic elastomer composition, adhesive force of a product may decrease. On the other hand, if the content of polybutene (PB) is greater than 50 parts by weight, cooling time of the injection-molding process increases due to a cooling time delay of non-crystalline polybutene (PB), therefore, the injection-molding may not be properly performed and cycling property may deteriorate.

The content of polypropylene (PP) may be in the range of 30 to 40 parts by weight, and may preferably be 30 parts by weight. If the content of polypropylene (PP) is less than 30 parts by weight in the thermoplastic elastomer composition, flowability decreases, so that injection-molding may not be properly performed. On the other hand, if the content of polypropylene (PP) is greater than 40 parts by weight, the compression set property may deteriorate due to increased hardness of the product, and processabilty may be reduced due to rigidity (stiffness) of a joint unit of the product.

The content of paraffin oil may be in the range of 110 to 130 parts by weight, and may preferably be 120 parts by weight. If the content of paraffin oil is less than 110 parts by weight in the thermoplastic elastomer composition, flowability may decrease during the injection-molding process, so that the injection-molding may not be properly performed and processability may decrease. On the other hand, if the content of paraffin oil is greater than 130 parts by weight, flowability increases, therefore, the injection-molding may not be properly performed, cooling time may increase, and thickness of the resulting product may not be uniform. In an embodiment of the invention, the paraffin oil used is, for example, high-viscosity paraffin oil, and the kinematic viscosity thereof may be 170 cSt or higher. Preferably, the kinematic viscosity thereof may be in the range of 170 to 180 cSt, at 40° C.

The content of the peroxide cross-linking agent may be in the range of 0.7 to 0.9 parts by weight, and may preferably be 0.8 parts by weight. If the content of the peroxide cross-linking agent is less than 0.7 parts by weight in the thermoplastic elastomer composition, cross-linking is not sufficiently performed, so that physical properties of the product such as, for example, viscoelasticity and weather resistance, may be reduced. On the other hand, if the content of the peroxide cross-linking agent is greater than 0.9 parts by weight, the cross-linking degree is so high that impurities such as fish-eyes may be produced at the external surface of the product, external defects may be caused during the injection-molding, or the injection-molding may not be properly performed.

The content of the antioxidant may be in the range of 0.5 to 0.8 parts by weight, and may preferably be 0.7 parts by weight. If the content of the antioxidant is less than 0.5 parts by weight in the thermoplastic elastomer composition, physical properties of the composition may deteriorate, and performance of a product may deteriorate after long term use. On the other hand, if the content of the antioxidant is greater than 0.8 parts by weight, manufacturing costs may increase and blooming of unreacted antioxidant may occur.

Furthermore, the content of the additives may be in the range of 0.4 to 0.6 part by weight, and may preferably be 0.5 parts by weight. The additives may include a co-cross-linking agent, a lubricant, a wax, and/or a filler, but are not limited thereto. Polypropylene wax, or the like, may further be used to improve the slippery nature of the surface and abrasion resistance of the joint connecting the glass run and the inner-belt.

The thermoplastic elastomer composition including the above-mentioned components according to the present invention may be used to efficiently manufacture a joint connecting a glass run and an inner-belt used, for example, in weather strips for cars. The glass run and the inner-belt are integrally molded by using the thermoplastic elastomer composition as a joint material. Although the molding method is not limited herein, an injection-molding may be used therefore.

When rubber is used to manufacture a joint connecting the glass run and the inner-belt, a curing process is required in order to provide elasticity to the rubber. However, according to the present invention, such a curing process is not required and the product may directly manufactured by using the thermoplastic elastomer. In other words, if a joint connecting the glass run and the inner-belt is prepared by using a rubber material, the manufacturing process includes 1) quantifying the rubber material, 2) injecting the rubber material into an injection-mold, 3) curing the rubber material, 4) cooling a product, 5) opening the mold, and 6) de-molding the product, and the manufacturing process takes about 7 to 8 minutes. On the other hand, if an injection-molding process is performed by using the thermoplastic elastomer composition according to the present invention, the method of manufacturing the product includes 1) injecting the thermoplastic elastomer composition into an injection-mold, 2) opening the injection-mold; 3) cooling a product, and 5) de-molding the product. Since the curing process is not required, the manufacturing process is completed within 1 minute, thereby reducing the speed of the entire manufacturing process compared with conventional art injection-molding processes.

In addition, since the thermoplastic elastomer composition according to the present invention may be recycled, burs and defective products produced during the injection-molding may be ground in real-time and recycled, thereby increasing environmental protection and cost savings. Additionally, the thermoplastic elastomer composition of the invention provides additional cost savings by reducing the need for workers and working hours normally required to trim burs that result from conventional art methods.

The present invention will be described in more detail with reference to the examples and experimental example below, but is not limited thereto. The following examples and experimental example are for illustrative purposes only and are not intended to limit the scope of the invention.

EXAMPLES

Examples 1 and 2 and Comparative Examples 1 to 3

Resin compositions for joints connecting glass runs and inner-belts having ingredients as shown in Table 1 below were prepared.

Ingredients of the resin compositions are as follows:
1) Ethylene propylene diene monomer (EPDM): KEP 2480™ manufactured by Kumho Polychem Co., Ltd. (Korea)
2) Polybutene: KTKTAR05™ manufactured by Baasel Korea Co., Ltd.
3) Polypropylene: SB 9310™, BP 2000™ manufactured by Korea Petrochemical Ind, Co., Ltd.
4) Paraffin oil: kinematic viscosity at 40° C.: 172 cSt, KL-900B™ manufactured by Seojin Chemical Co., Ltd.
5) Peroxide cross-linking agent: PEROXAN HX50PS™ manufactured by Taehwa Corporation
6) Antioxidant: ZnO, manufactured by Hanil Chemical Industrial Co., Ltd.
7) Co-cross-linking agent: TAC-50™ manufactured by Dae Jin Chemical Ind. Co., Ltd.
8) Lubricant: Ca-St manufactured by Woochang Dominican Industrial Co., Ltd. and SZ210™ manufactured by Songwon Industrial Co., Ltd.
9) Wax: polypropylene wax, LC-525N™ manufactured by Lion Chemtech Co., Ltd.
10) Filler: 5-1000™ manufactured by Nexen Inc.

TABLE 1

|  |  | Example (parts by weight) | | Comparative Example (parts by weight) | | |
|---|---|---|---|---|---|---|
|  |  | 1 | 2 | 1 | 2 | 3 |
| EPDM |  | 80 | 90 | 60 | 70 | 100 |
| Polybutene |  | 40 | 50 | 20 | 30 | 60 |
| Polypropylene |  | 30 | 40 | 10 | 20 | 50 |
| Paraffin oil |  | 120 | 130 | 100 | 110 | 140 |
| Peroxide cross-linking agent |  | 0.8 | 0.9 | 0.6 | 0.7 | 1.0 |
| Antioxidant |  | 0.7 | 0.9 | 0.3 | 0.5 | 1.1 |
| Other additives | Co-cross-linking agent | 0.4 | 0.5 | 0.1 | 0.3 | 0.6 |
|  | Lubricant | 0.3 | 0.4 | 0.1 | 0.2 | 0.5 |
|  | Wax | 0.5 | 0.7 | 0.1 | 0.3 | 0.9 |
|  | Filler | 15 | 20 | 5 | 10 | 25 |

Experimental Example

Experimental Example 1

Measuring Physical Properties

Basic physical properties such as, for example, thermal resistant properties, compression set, ozone resistance, injection-molding efficiency, and abrasion resistance of the compositions prepared according to Examples 1 to 2 and Comparative Example 1 to 3 were measured, and the results are shown in Table 2 below. The physical properties were measured using the following methods.

Methods of Measuring Physical Properties
1) Thermal resistant properties were measured after maintaining the compositions at 70° C. for 70 hours.
2) Compression set was obtained by measuring restoring force after maintaining the compositions at 70° C. for 22 hours.
3) Ozone resistance was measured by identifying cracks on the external surface after being exposed to 50 pphm of ozone at 40° C. for 72 hours.
4) Injection-molding property was evaluated by using injection-molding time (sec), cooling time (sec), and the shape of a product after injection-molding. In order to identify adhesive force of a joint, the joint was subjected to a tensile test, and the results were rated as excellent (⊚), good (○), average (Δ), poor (x)[Please confirm that the correct symbols have been listed here].
5) Abrasion resistance was measured by identifying abrasion of a product and stains of glass after raising and lowering a door glass 30,000 times.

TABLE 2

|  |  | Examples | | Comparative Example | | |
|---|---|---|---|---|---|---|
|  |  | 1 | 2 | 1 | 2 | 3 |
| Basic physical properties | Hardness (Shore A) | 70 | 72 | 61 | 66 | 73 |
|  | Tensile strength (kgf/cm$^2$) | 65 | 69 | 54 | 59 | 71 |
|  | Tensile elongation at break point (%) | 520 | 530 | 420 | 460 | 510 |
|  | Tear strength (kgf/cm) | 27 | 29 | 18 | 22 | 29 |
| Thermal resistant properties | Hardness variation (%) | +5 | +5 | +10 | +8 | +4 |
|  | Tensile strength variation (%) | −13 | −12 | −22 | −18 | −12 |
|  | Elongation variation | −20 | −17 | −30 | −27 | −18 |
| Compression set (%) |  | 35 | 35 | 42 | 39 | 36 |
| Ozone resistance |  | ⊚ | ⊚ | x | Δ | ⊚ |
| Injection-molding efficiency |  | ⊚ | ○ | x | Δ | ○ |
| Adhesive force |  | ⊚ | ○ | Δ | Δ | ⊚ |
| Abrasion resistance |  | OK | OK | NG | NG | NG |
| Indoor sound |  | 61d B | 61.5 dB | 63.5 dB | 63 dB | 62.3 dB |

As shown in Table 2, the compositions prepared according to Examples 1 and 2 have high strength, can efficiently be injection-molded, and particularly, have high adhesive force, excellent ozone resistance, and excellent abrasion resistance, for use as a resin composition for a joint connecting a glass run and an inner-belt. Without being bound by theory, it is believed that the excellent thermal resistance and permanent deformation properties of the compositions from Examples 1 and 2 are caused by reinforcement effect obtained by adjusting the contents of polybutene, polypropylene, and the peroxide cross-linking agent. The compositions from Examples 1 and 2 have high adhesive force and excellent moldability, and the results of indoor sound evaluation show that the compositions from Examples 1 and 2 reduce noise by a max of 2 dB more than those from Comparative Examples 1 to 3. Compression set of the compositions prepared according to Examples 1 and 2 is lower than those from Comparative Examples 1 to 3, and the compositions from Examples 1 and 2 are less deformed than those from Comparative Examples 1 to 3 after long term use.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A thermoplastic elastomer composition comprising:
   an ethylene propylene diene monomer (EPDM);
   a polybutene (PB);
   a polypropylene (PP);
   a paraffin oil;
   a peroxide cross-linking agent; and
   an antioxidant,
   wherein the EPDM comprises 80 to 90 parts by weight.

2. The thermoplastic elastomer composition of claim 1, wherein the EPDM comprises 80 parts by weight.

3. The thermoplastic elastomer composition of claim 1, wherein the PB comprises 30 to 50 parts by weight.

4. The thermoplastic elastomer composition of claim 1, wherein the PB comprises 40 parts by weight.

5. The thermoplastic elastomer composition of claim 1, wherein the PP comprises 30 to 40 parts by weight.

6. The thermoplastic elastomer composition of claim 1, wherein the PP comprises 30 parts by weight.

7. The thermoplastic elastomer composition of claim 1, wherein the paraffin oil comprises 110 to 130 parts by weight.

8. The thermoplastic elastomer composition of claim 1, wherein the paraffin oil comprises 120 parts by weight.

9. The thermoplastic elastomer composition of claim 1, wherein the peroxide cross-linking agent comprises 0.7 to 0.9 parts by weight.

10. The thermoplastic elastomer composition of claim 1, wherein the peroxide cross-linking agent comprises 0.8 parts by weight.

11. The thermoplastic elastomer composition of claim 1, wherein the antioxidant comprises 0.5 to 0.8 parts by weight.

12. The thermoplastic elastomer composition of claim 1, wherein the antioxidant comprises 0.7 parts by weight.

13. The thermoplastic elastomer composition of claim 1, wherein the paraffin oil has a kinematic viscosity of 170 cSt or higher at 40° C.

14. The thermoplastic elastomer composition of claim 1, wherein the antioxidant is zinc oxide (ZnO).

15. The thermoplastic elastomer composition of claim 1, further comprising 0.4 to 0.6 part by weight of one additive selected from the group consisting of a co-cross-linking agent, a lubricant, a wax, a filler, and any combination thereof.

16. A thermoplastic elastomer composition comprising:
    80 to 90 parts by weight of an ethylene propylene diene monomer (EPDM);
    30 to 50 parts by weight of polybutene (PB);
    30 to 40 parts by weight of polypropylene (PP);
    110 to 130 parts by weight of paraffin oil;
    0.7 to 0.9 parts by weight of a peroxide cross-linking agent;
    0.5 to 0.8 parts by weight of an antioxidant; and
    optionally 0.4 to 0.6 part by weight of one additive selected from the group consisting of a co-cross-linking agent, a lubricant, a wax, a filler, and any combination thereof, wherein the thermoplastic elastomer composition is used to manufacture a joint connecting a glass run and an inner-belt by integrally injection-molding the glass run and the inner-belt.

17. The thermoplastic elastomer composition of claim 16, wherein the paraffin oil has a kinematic viscosity of 170 cSt or higher at 40° C.

18. The thermoplastic elastomer composition of claim 16, wherein the antioxidant is zinc oxide (ZnO).

19. A thermoplastic elastomer composition comprising:
    80 parts by weight of an ethylene propylene diene monomer (EPDM);
    40 parts by weight of polybutene (PB);
    30 parts by weight of polypropylene (PP);
    120 parts by weight of paraffin oil, wherein the paraffin oil has a kinematic viscosity of 170 to 180 cSt at 40° C.;
    0.8 parts by weight of a peroxide cross-linking agent;
    0.7 parts by weight of an antioxidant, wherein the antioxidant is zinc oxide (ZnO); and
    optionally 0.5 part by weight of one additive selected from the group consisting of a co-cross-linking agent, a lubricant, a wax, a filler, and any combination thereof, wherein the thermoplastic elastomer composition is used to manufacture a joint connecting a glass run and an inner-belt by integrally injection-molding the glass run and the inner-belt.

* * * * *